(12) United States Patent
Inkinen et al.

(10) Patent No.: US 6,400,931 B1
(45) Date of Patent: Jun. 4, 2002

(54) CARD-LIKE WIRELESS COMMUNICATION DEVICE

(75) Inventors: Sami Inkinen, Hämeenlinna; Timo Herranen, Viiala, both of (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/247,191

(22) Filed: Feb. 9, 1999

(30) Foreign Application Priority Data

Feb. 10, 1998 (FI) ................................. 980300

(51) Int. Cl.⁷ .................... H04B 1/38; H04B 1/034; H04B 1/04
(52) U.S. Cl. .................... 455/90; 455/95; 455/97; 455/128; 455/129; 455/557; 455/558; 455/575
(58) Field of Search ................... 455/90, 128, 129, 455/269, 556, 557, 575, 100, 277.1, 278.1, 351; 340/702, 825.44

(56) References Cited

U.S. PATENT DOCUMENTS

| | | | |
|---|---|---|---|
| 4,998,078 A | 3/1991 | Hulkko | 333/109 |
| 5,109,539 A * | 4/1992 | Inubushi et al. | 455/89 |
| 5,341,149 A | 8/1994 | Valimaa et al. | 343/895 |
| 5,361,061 A * | 11/1994 | Mays et al. | 439/159 |
| 5,557,288 A * | 9/1996 | Kato et al. | 343/702 |
| 5,561,439 A | 10/1996 | Moilanen | 343/846 |
| 5,627,550 A | 5/1997 | Sanad | 343/700 MS |
| 5,628,055 A * | 5/1997 | Stein | 455/89 |
| 5,657,028 A | 8/1997 | Sanad | 343/700 MS |
| 5,680,144 A | 10/1997 | Sanad | 343/700 MS |
| 5,695,351 A * | 12/1997 | Kimura et al. | 439/159 |
| 5,768,110 A * | 6/1998 | Frommer et al. | 361/755 |
| 5,832,372 A | 11/1998 | Clelland et al. | 455/115 |
| 5,854,970 A | 12/1998 | Kivela | 455/90 |
| 5,856,806 A | 1/1999 | Koleda | 343/702 |
| 5,918,163 A * | 6/1999 | Rossi | 455/90 |

FOREIGN PATENT DOCUMENTS

| | | |
|---|---|---|
| EP | 0 783 236 A1 | 7/1997 |
| WO | WO 94/26038 | 11/1994 |
| WO | WO 97/49194 | 12/1997 |

* cited by examiner

*Primary Examiner*—Thanh Cong Le
*Assistant Examiner*—Meless Zeudu
(74) *Attorney, Agent, or Firm*—Perman & Green, LLP

(57) ABSTRACT

A card-like wireless communication device including at least a frame part and an antenna structure, the antenna structure comprising an antenna part and fixing means for arranging the antenna part in connection with the frame part. The card-like wireless communication device also includes a first part and a second part, the parts being arranged to be movable in relation to each other in at least the longitudinal direction of the card-like wireless communication device. The first part is arranged as the frame part and the second part is arranged as the antenna part which can be moved in at least two different positions.

16 Claims, 5 Drawing Sheets

CARD-LIKE WIRELESS COMMUNICATION DEVICE

BACKGROUND OF THE INVENTION

1. Field of the Invention

The present invention relates to a card-like wireless communication device as set forth in the preamble of claim 1. The invention relates also to a method in the manufacture of a card-like wireless communication device as set forth in the preamble of claim 8.

2. Description of the Prior Art

In wireless communication devices, such as mobile stations, antennas used for the transmission and receiving of radio-frequency signals include, in a known manner, a monopoly antenna and a helix antenna. The radio-frequency signals are transmitted between the radio part and the antenna of the wireless communication device usually by means of conductors and connectors.

The monopole antenna is, in principle, a straight conductor which is placed substantially perpendicularly above the conducting level and whose length depends e.g. on the frequency range of the radio-frequency signal used at the time. For example in mobile stations, the monopoly antenna is implemented, in a manner known as such, as pulled-out antenna structure so that an antenna conductor or the like, placed inside the frame of the mobile station, can be pulled out from the mobile station for the time of a call. Pulled to its extreme position, the antenna conductor is locked in position and simultaneously coupled electrically to be ready to use with the radio part of the mobile station. After the call, the antenna conductor is usually inserted back in the housing of the mobile station.

The helix antenna is a conductor with a right-hand or a left-hand helix which is placed on top of the conducting level. Using the helix antenna, the antenna is made shorter than the monopoly antenna when operating in the same frequency range. In mobile stations, the helix antenna is implemented in a known manner so that the antenna conductor is placed inside a cylindrical or conical antenna structure used as a shield which is further fixed to the mobile station, usually placed at least partly outside the same. Also this structure, being placed outside the mobile station, is liable to damage.

For the operation of the antenna, it is advantageous that the antenna is placed in a free space outside a mobile station or a corresponding device. Thus, the antenna is placed farther from components of the device which may cause radio interference, such as integrated circuits (IC) and radio frequency (RF) circuits, and the structures of the device do not interfere with the radiation pattern of the antenna, whereby reception of radio-frequency signals is more reliable, particularly in a weak signal field.

Further, portfolio-type portable computers are known which comprise the necessary radio elements and an antenna for data transmission in a wireless manner via a radio connection. These wireless communication devices apply, in a known manner, the above-described pulled-out monopoly antenna and an antenna structure which is placed e.g. in connection with a display placed in the cover part. Also, a portfolio-type portable computer is known where the antenna structure comprises a helix antenna which is placed at the end of an arm construction and which can be placed totally shielded inside the device. When at least partly pulled out, the helix antenna can be made as far as possible from those elements of the device which cause radio interference.

A drawback with the above-mentioned devices is the fact that the antenna structure or the end of the antenna must be gripped for pulling out the antenna from the device, whereby the antenna must be arranged at least partly protruding from the device. A particular drawback is thus the fact that the protruding part of the antenna can be attached to something particularly during transportation of the device, damaging the antenna. For placing the antenna fully shielded inside the device, the device itself must be equipped with extra recesses or holes so that the antenna structure could first be moved a bit out of the device, after which the antenna can be gripped more easily for pulling it out. Such an operation for pulling out the antenna is, however, slow and laborious.

According to prior art, for example portfolio-type portable personal computers (PC) are often equipped with an expansion card connection to which a standard expansion card can be connected. These expansion cards have the size and shape of almost a credit card and are intended to constitute a functional unit with the PC. Known expansion cards include memory cards (RAM and ROM cards), modem cards and different input/output (I/O) cards as well as fixed disk cards. The expansion cards can also contain the radio parts of a wireless communication device, including an antenna, whereby the PC can communicate by means of this card-like wireless communication device with other devices or a communication network, such as a GSM network (Global System for Mobile Communication).

One known expansion card is the PC card complying with the PCMCIA standard (Personal Computer Memory Card International Association). The PCMCIA standard defines also the physical size of the PC card, whereby the length of the PC card is 85.6 mm and the width is 54 mm. PC cards are further divided into three types, whereby the thickness of the PC card can be 3.3 mm (type I), 5.0 mm (type II) or 10.5 mm (type III). PC cards are designed to be inserted wholly inside a PC, but so-called extended PC cards are placed partly outside the PC, whereby the thickness and design of the PC cards can vary in this part placed outside the PC. This part can also be provided with the antenna of a wireless communication device.

One known card-like wireless communication device comprising a transceiver with its antenna is the Nokia Cellular Card Phone that can be connected with expansion card connections of PC card types II and III of the PCMCIA standard. The card phone (CP) of prior art is presented in the patent application EP 0 783 236 A1. Said card phone (CP) can comply e.g. with the GSM standard, whereby the PC device to which the card phone (CP) is connected, can be in wireless communication with base stations of the Public Land Mobile Network (PLMN) by means of radio waves. In the card phone, the antenna part containing the antenna is placed in that part of the card phone (CP) which is outside the PC device, and the antenna part is integrated in the card-like part of the card phone (CP) which is placed inside the expansion card connection. One embodiment of the card phone (CP) of prior art is shown in FIG. 5.

Card-like wireless communication devices can be detached from the expansion card connection of the PC device, whereby the protruding parts of the PC card cannot be attached to anything during transportation of the PC device, whereby the PC card or its antenna part could be damaged or broken. For pulling out the card phone (CP) from the expansion card connection, the protruding part of the PC card or the antenna part is gripped. A disadvantage with such devices is, however, just the fact that the card-like wireless communication device must be removed from the PC device for transportation, whereby making the device ready to use may require inserting the wireless communication device back in its place.

SUMMARY OF THE INVENTION

The purpose of the present invention is to eliminate the above-mentioned drawback and to present a considerable improvement to the prior art by means of a wireless communication device according to the invention. The wireless communication device of the invention is characterised in what is presented in the characterising part of claim 1. The method for manufacturing a card-like wireless communication device according to the invention is characterised in what is presented in the characterising part of claim 8.

The card-like wireless communication device of the invention, such as a card phone (CP), has the significant advantage that by designing the card to correspond with the dimensions of a PCMCIA card and by placing the antenna part transversely at the end of the card, the whole card-like wireless communication device can be designed in the size of the PCMCIA card, i.e. 85.6 mm long and 54 mm wide. Thus, this PCMCIA card fits entirely inside the expansion card connection of e.g. a PC device. Thanks to the movement mechanism of the antenna structure, the antenna part can be simply equipped also with the option, known as such, that the antenna can be turned to a desired angular position in its operational position, for example by a rotating movement around the functional axis of the movement mechanism. In the above-described case, the length of the antenna part is 54 mm, but by arranging the antenna part to be pivotal and to act also in a telescopic manner, it can be moved also in its longitudinal direction. The pivoting of the antenna is necessary in order to make the radiation pattern of the antenna in a position which is as optimal as possible for receiving and transmitting a radio signal.

Further, the card-like wireless communication device according to the invention, such as a card phone (CP), has the considerable advantage that the card phone (CP) does not need to be removed from the PC device for the time of transportation. Thus, the taking into use of the PC device, setting up of the radio connection and starting of wireless data transmission is accelerated, and the card phone (CP) does not need to be stored separately from the PC device. At the same time, also the installations of the card phone (CP) in the expansion card connector and removals from the connector are reduced, thereby reducing the wearing and failures of the connector.

It is a considerable advantage of the card-like wireless communication device of the invention that the antenna part can be placed at least in its transport position wholly inside e.g. a wireless communication device, whereby the antenna structure is protected. Another advantage is that the wireless communication device or the antenna part, e.g. its end, does not need to be provided with recesses, openings or extra parts for pulling out the antenna from the device. Pulling out of the antenna part is considerably quicker and easier than in prior art. Thus, also the risk that the antenna part or said extra parts are attached to something during transportation, is reduced in view of prior art.

A particular advantage of the invention is that the antenna part with the antenna is in its operative position placed in a free space outside the device. Thus the antenna is placed farther from the components of the device causing radio interference, such as the processor of a computer. The effect of electromagnetic disturbances caused by the components is reduced when the distance increases. Further, the structures of the device do not disturb the radiation pattern of the antenna, wherein the reception of radio-frequency signals is more reliable particularly in a weak signal field.

Another considerable advantage of the antenna structure of the card-like wireless communication device according to the invention is that the movement of the antenna part can be arranged so that the user does not need to pull out the antenna part but thanks to the spring-like operation of the antenna structure, the antenna part is pushed by its own force out of the device. Thus, the antenna part can be moved readily to its functional position at a selected distance from the device, whereby the user does not need to take care of pulling out the antenna part to this distance.

The antenna structure according to an advantageous embodiment of the invention is particularly advantageous when the operational axis of the shifting mechanism of the antenna part is transverse to the antenna part. Thus, the antenna part, pulled out e.g. at the side of a PC device, is substantially parallel to this side, and the antenna part takes less space in the side direction than an antenna part which is transverse to said side when pulled out. A further advantage is that the movement carried out by the user for shifting the antenna part into the transport position is smaller than in the case that the operating axis and the antenna part are substantially parallel. At the same time, the antenna part is not pushed at its end, like monopoly antennas of mobile stations of prior art, whereby the risks of bending particularly a wire-like antenna in connection with inserting it are reduced.

Moreover, the card-like wireless communication device of the invention has the particular advantage that the removal of the card from the expansion card connector is easier than in prior art, because the antenna part of the antenna structure shifted in its operational position can be used also for pulling out the card itself.

Further, an advantageous embodiment of the card-like wireless communication device of the invention has the advantage that the lock stud placed in the card is used for preventing twisting of the antenna part in its transportation position, whereby it is also easier to handle separately from the PC device. In addition, when the card-like wireless communication device is installed in the expansion card connector of the PC device and when the antenna part is moved from the transport position to an intermediate position or from the operational position to the intermediate position, the antenna part is not simultaneously twisted, whereby it is guided more easily in the connector slot and its attachment to the edges of the connector slot is prevented preferably totally.

BRIEF DESCRIPTION OF THE DRAWINGS

In the following, the invention will be described in more detail with reference to the appended drawings, in which.

DETAILED DESCRIPTION OF THE PREFERRED EMBODIMENT

Figure 1:
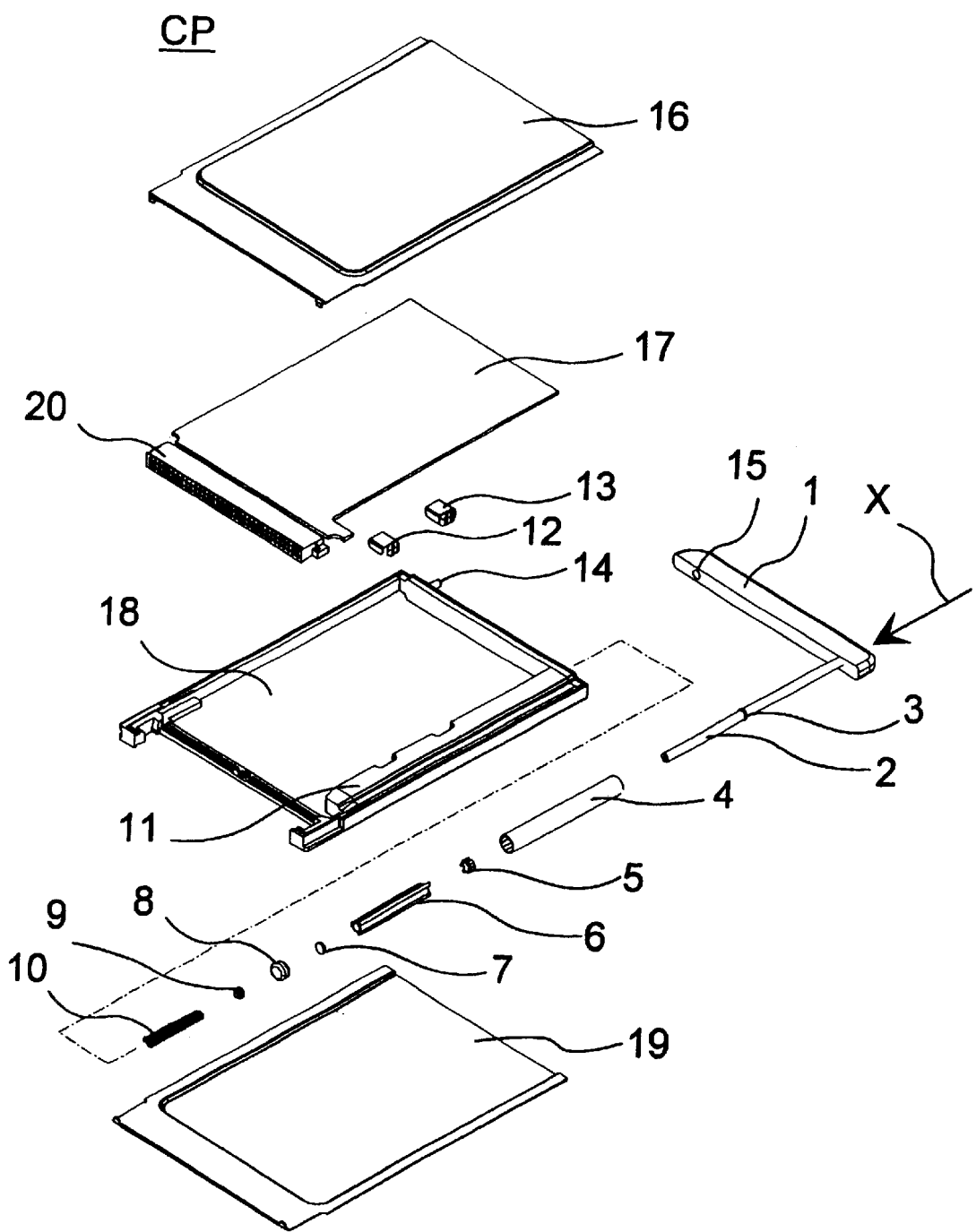
FIG. 1 is an explosion view showing an advantageous embodiment of the card-like wireless communication device according to the invention.
Figure 2:
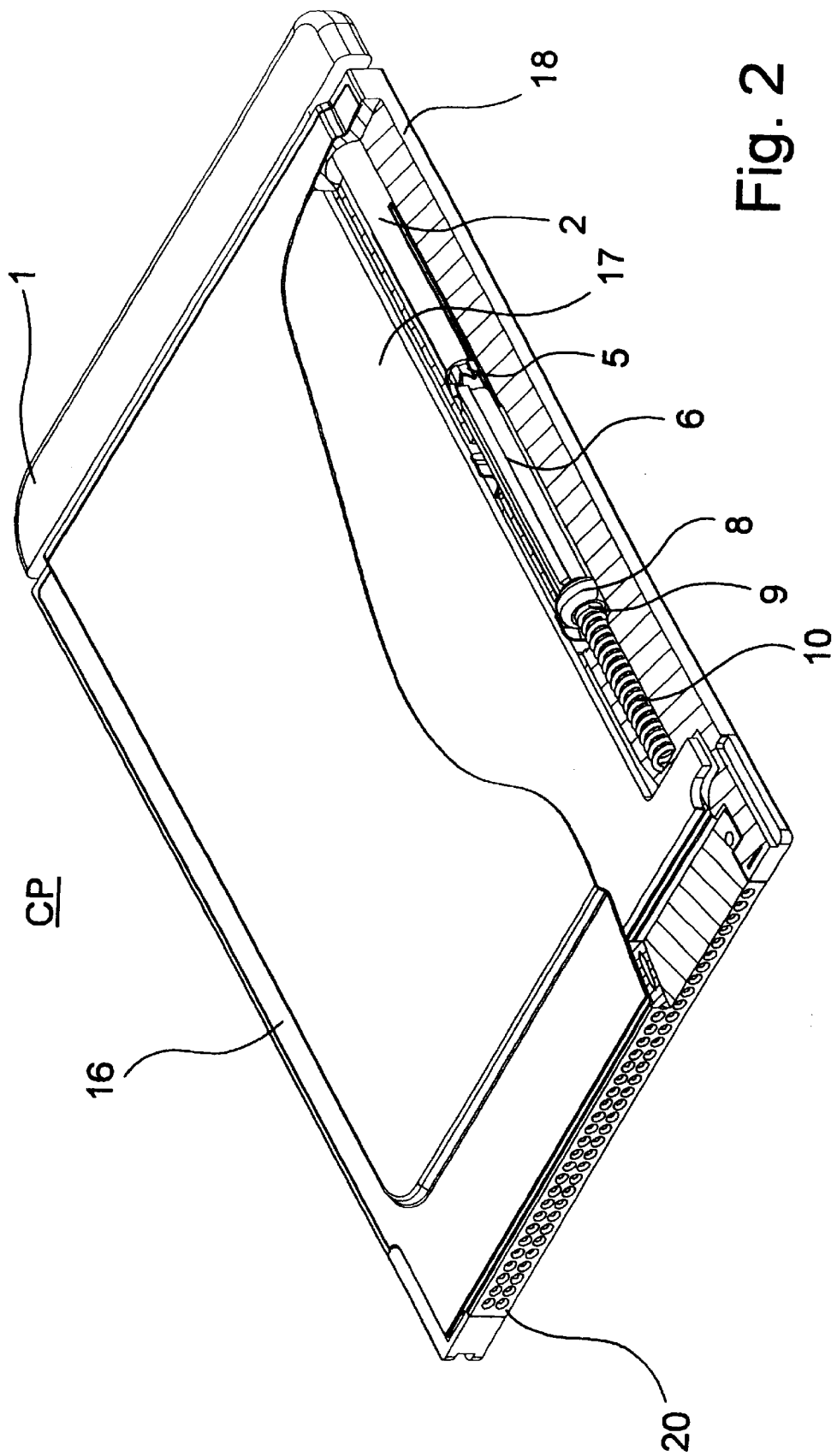
FIG. 2 is a perspective view showing an advantageous embodiment of the card-like wireless communication device according to the invention, partly cut open.

With reference to the explosion view of FIG. 1 and the perspective view of FIG. 2, a card-like wireless communication device CP comprises a frame 16–20 and an antenna structure 1–15. The antenna structure 1–15 comprises an antenna part 1 and fixing means 2–20 to make the antenna part 1 movable in connection with the frame part 16–20. As shown in FIG. 1, the card-like wireless communication device CP comprises a first part 16–20 and a second part 1, which parts 1 and 16–20 are arranged to be movable in relation to each other in the longitudinal direction of the card-like wireless communication device CP (arrow X) by means of the fixing means 2–20. Thus, the movement can take place back and forth in both directions of this longitudinal direction (arrow X). In the card-like wireless communication device CP shown in FIGS. 1 and 2, the first part 16–20 is arranged as the frame part 16–20 and the second part 1 is arranged as the antenna part 1 containing the antenna, which can be movable into a first position A1 shown in FIG. 3, which in this description is called the transportation position A1, to a second position A2, which in this description is called the intermediate position A2, and further to a third position A3, which in this description is called the operational position A3. It is obvious that the card CP can be divided also into more than two parts which can be arranged movable in relation to each other. In one embodiment of the presented invention, the radio parts of the card-like wireless communication device are placed in the frame part 16–20, but it is obvious that the components of the radio part or other components can be placed also in the antenna part 1 which can be formed wider than shown in the figures.

Further, with reference to FIGS. 1 and 2, the card-like wireless communication device CP with its antenna structure 1–15 is designed as a PC card complying with the PCMCIA standard. Further, with reference to FIG. 3, the length L of the PC card is 85.6 mm and width W is 54 mm in accordance with the PCMCIA standard. PC cards are divided into three types, whereby the thickness of the PC card in its middle section can be 3.3 mm (type I), 5.0 mm (type II) or 10.5 mm (type III). The PC cards are designed to be inserted fully inside the PC by a movement in the direction of the longitudinal axis of the PC card (arrow X). The PC card is equipped with a 68-pole connector according to the PCMCIA standard, by means of which the PC card is connected e.g. with a PC. At the point of this connector and at the edge of the PC card, the thickness of the PC card is 3.3 mm.

If the card-like wireless communication device CP, which in the following description will also be called a card CP, is arranged e.g. as a card phone according to the GSM standard, the cover structure 16 or 19 of the card CP is provided with an opening (not shown in the figures) for the SIM module (subscriber identity module) of the card phone. The card CP comprises further connector means 20 and frame means 18, whereby the circuit board 17 of the card CP, as well as the radio parts, such as a transceiver (not shown in the figures), are placed inside the card CP.

The connector means 20 are fixed in the circuit board 17 placed inside the card CP and provided also with the components necessary for the operations of the card CP, such as integrated circuits (IC, not shown in the figures), as well as wirings (not shown in the figures) for transferring the electric signals between the connector means 20 and the components. Also means for transferring signals between the antenna of the card CP and the components of the circuit board 17 will be needed. The operation of the card-like wireless communication device, such as the card phone mentioned earlier, is known as such to a man skilled in the art, whereby an extensive description will not be needed in this context.

Further, with reference to FIGS. 1 and 2, the antenna structure 1–15 of the card CP comprises an antenna part 1 and means 2–11 for fixing the antenna part 1 in connection with the card CP. In the connection, also the coupling of the antenna signal must be taken care of, and also, if necessary, the coupling of ground potential to the antenna part 1 and further to the antenna. Moreover, the elongated antenna part 1 is placed in a transverse direction to the direction of pressing (arrow X), whereby the antenna part is preferably 54 mm long so that it would not exceed the maximum width determined for the expansion card according to the PCMCIA card. By connection means 20, the card CP is connected into the expansion card connector of a PC device. Further, the antenna part 1 is placed at opposite end of the card CP in relation to the connection means 20, whereby when the card CP is entirely inside the expansion card connection, the antenna part 1 can be moved by pressing (arrow X) out of the connection and turned, if necessary, into a desired angular position.

Figure 3:
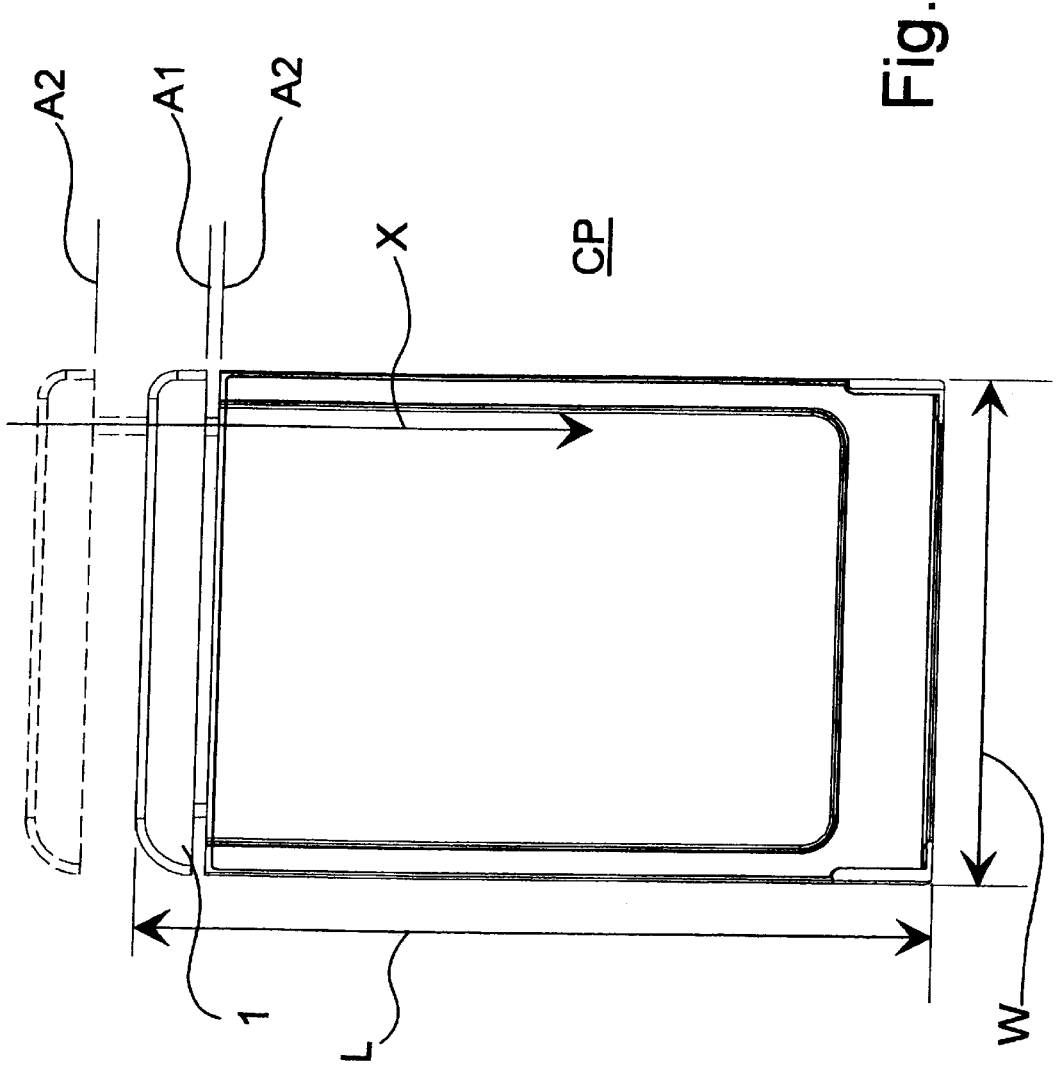
FIG. 3 is a top view on an advantageous embodiment of the card-like wireless communication device of the invention, with the antenna part set in the transportation position.

The fixing means 2–11 comprise a spring-like transfer mechanism 2–11 for moving the antenna part 1 by pressing into the transport position A1, the operating position A3 and the intermediate position A2 as shown in FIG. 3. In its operating position A3, the antenna part 1 is indicated by broken lines, and in its transport position, it is shown by a continuous line in FIG. 3. In FIG. 3, the lines referring to the positions A1, A2 and A3 indicate the point at which one edge of the antenna part 1 is placed in said positions, when the antenna part 1 is substantially aligned with the card CP. The spring-like transfer mechanism 2–11 is provided for moving the antenna part 1 from the transport position A1 to the intermediate position A2 and further to the operational position A3, as well as for moving the antenna part 1 from the operational position A3 to the intermediate position A2 and further back to the transport position A1. Pressing e.g. with a finger is conducted in the direction compressing said mechanism 2–11 (arrow X). The transport position A1 is placed substantially between the operational position A3 and the intermediate position A2.

The transfer mechanism 2–11 comprises a rotary means 2 fixed in the antenna part 1, a locking means 3, a chuck nut 4, a turning means 5, a revolving means 6, a first insulator 7, a switching disk 8, a second insulator 9, and a pressure spring 10 arranged as a helical spring 10. The mechanism 2–11 comprises also a housing part 11 formed in the frame means 18 and accommodating at least part of the mechanism 2–11. The mechanism 2–11 comprises further a first contact spring 12 and a second contact spring 13 for the purpose of coupling the antenna part 1 electrically with the circuit board.

The transfer mechanism 2–11 operates according to the following example. The inner surface of the chuck nut 4 is provided with longitudinal grooves of two alternating lengths where the revolving means 6 can glide in different positions. When the antenna part 1 is being pressed (arrow X), the cog-like inclined surfaces arranged in the turning means 5 effect the rotation of the revolving means 6 around its longitudinal axis to the next step. After this, when the antenna part 1 is released from pressing, the revolving means 6 is pushed into the chuck nut 6 under pressure by the pressure spring 10 as long as allowed by the groove length of the phase in question or allowed by e.g. the locking means 3. The parts 4, 5 and 6 are dimensioned so that the turning means 5 glides always inside the chuck nut 4 and thus cannot rotate. Instead, at the end phase of the pressure movement, corresponding to the intermediate position A2 of the antenna part 1, the revolving means 6 comes entirely out of the grooving of the chuck nut 4 and is thus allowed to rotate. The end of the revolving means 6 on the side of the turning means 5, is provided with cog-like inclined surfaces which, are arranged to cooperate with the turning means 5 and the chuck nut 4. The locking mentioned in the specification means that e.g. the antenna part 1 is left, pushed by the pressure spring 10, in the position A1 or A3. The antenna part 1 is not locked in the intermediate position A2 but is allowed, pushed by the pressure spring 10, to move from this intermediate position A2 for example into the transport position A1. The inner surface of the chuck nut 4 can be provided with longitudinal grooves of also more than two alternating lengths, thereby providing more than one operational positions of the antenna part 1 corresponding to the operational position A3. Thus, the antenna part 1 can be moved by pressing from one operational position to another. However, the movement from different positions to other positions takes place always via the intermediate position A2, and a new operational position corresponds to the transport position A1 described in the specification.

Figure 4:
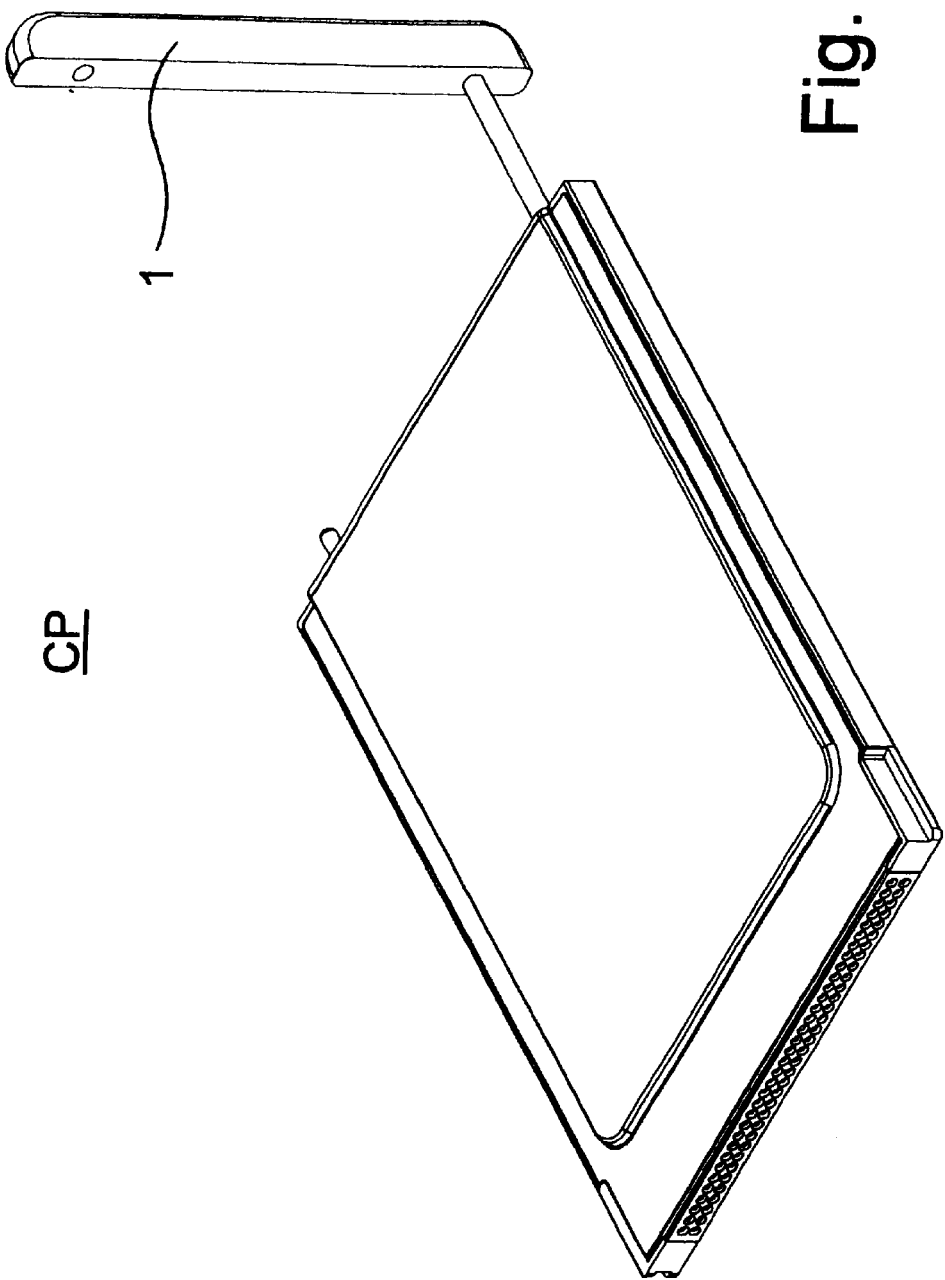
FIG. 4 is a perspective view showing an advantageous embodiment of the card-like wireless communication device of the invention, with the antenna part set in the operation position and turned in an angular position.
Figure 5:
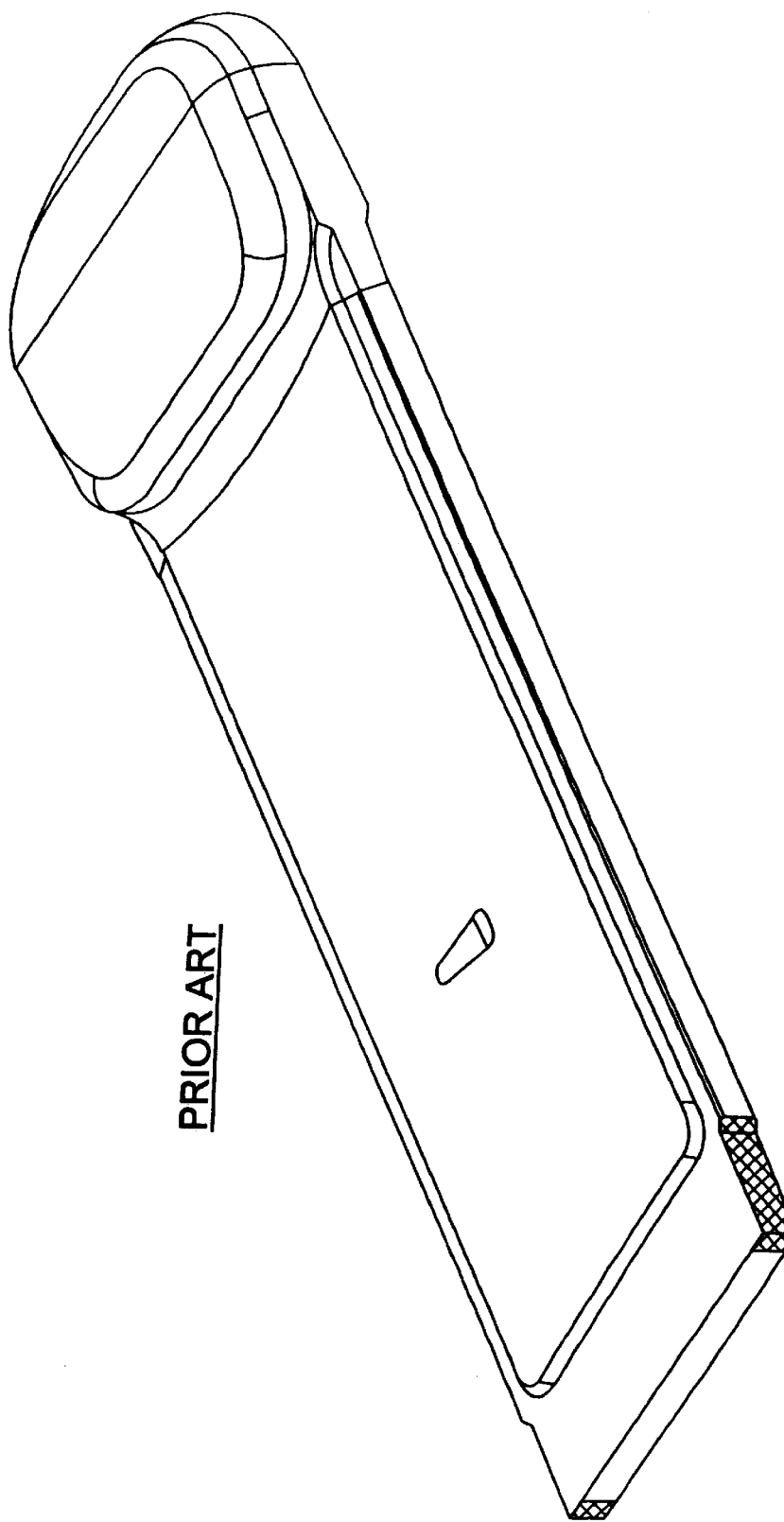
FIG. 5 is a perspective view showing a card-like wireless communication device of prior art.

It should be noted that the terms describing the positions A1, A2, and A3 (intermediate position, operational position, transport position) are given only for illustration the operation of the antenna structure 1–15 and for separating different positions from each other, and they do not describe the exact position of the antenna part 1. However, e.g. the transport position A1 is preferably the position in which the antenna part 1 is locked and which constitutes, together with the card CP, a structure with a length of preferably 85.6 mm. The location of the operational position A3 can vary even to a great extent, but in this position, the antenna part 1 is preferably far from the frame parts 16–20 of the card CP at the point where the antenna part 1 can be turned around a line parallel to the direction of pressing (arrow X) to a desired angular position. One angular position of the antenna part 1 is shown in FIG. 4 where the antenna part 1 is substantially perpendicular to the card CP.

The force effective on the antenna part 1 in the direction of pressing (arrow X) is transmitted by the locking means 3 protruding from the rotary means 2, whereby the locking means 3 can be a locking ring or a lug formed in the rotary means 2. By the locking means 3, the rotary means 2 can rotate within the chuck nut 4, whereby the antenna part 1 integrated in the rotary means 2 turns simultaneously. For coupling the antenna (not shown in the figure), such as a helix antenna, placed in the antenna part 1, electrically with the circuit board 17 of the card CP, an insulated conductor (not shown in the figure) provided inside the rotary means 2 is used. The conductor extends further in the pressing direction (arrow X) through the parts 4, 5 and 6 as well as the first insulator 7 to the switching disk 8 to which the conductor is coupled electrically. The purpose of the first insulator 7 and the second insulator 9 is to insulate the switching disk 8 electrically from the other parts. The ground potential required by the antenna can be coupled e.g. via the outer shell of the rotary means 2, whereby it must be at least partly electroconductive. One possibility is to use means like contact springs 12 and 13 for coupling the ground potential to the antenna.

The switching disk 8 is coupled electrically to the circuit board 17 by means of the first contact spring 12 or the second contact spring 13, depending on the position of the antenna part 1. These contact springs 12 and 13 extend through the housing part 11 to the switching disk 8, and they are fixed onto the circuit board 17. For using more than two positions in which the antenna must be coupled electrically to the circuit board 17, the structure must be provided with more contact springs. It is also possible that the coupling is arranged in only one position of the antenna part 1, preferably in the operating position A3, whereby the contact spring 12 is totally eliminated. It is also possible that the operation of the radio part of the card CP is turned on and off depending on the position of the antenna part 1, or on the contact spring that the antenna is coupled to.

The purpose of the pressure spring 10 belonging to the antenna structure 1–15 is to generate a force opposite to the pressing direction (arrow X) for moving the parts 1–3 and 5–9 in relation to the chuck nut 4 which is advantageously locked in position in the housing part 11 in connection with the card CP. Thus, moving the antenna part 1 in different positions requires advantageously only a movement in the pressing direction (arrow X) and a pressing force for compressing the pressure spring 10, after which the antenna part 1 springs up spontaneously in the opposite direction.

If the pressure movement is so long that the revolving means 6 can revolve in a new position (thus corresponding to the intermediate position A2), the antenna part 1 can spring up to the transport position A1 or to the operating position A3 depending on the length of the grooving of the chuck nut 4. The antenna part 1 does not remain locked in the intermediate position A2 which is only used as an intermediate phase required by the mechanism for moving into different positions. In this intermediate position A, the card CP is substantially shortest, and a sufficient space must be provided between the antenna part 1 and the frame part 16–20 to allow for movement of the antenna part 1.

Further, with reference to FIGS. 1 and 2, an advantageous embodiment of the invention comprises a guide pin 14 or the like fixed in the frame part 16–20, preferably its frame means 18. The purpose of this guide pin 14 is to prevent rotation of the antenna part 1 at least in its transport position A1, around the longitudinal axis of the rotary means 2. In the presented advantageous embodiment, the guide pin 1 prevents the rotation of the antenna part 1 also in its intermediate position A2. Simultaneously, the guide pin 14 also guides the movement of the antenna part 1. The guide pin 14 is arranged to be connected with a recess 15 or the like formed in the antenna part 1. Alternatively, the guide pin 14 can be provided in the antenna part 1 and a recess 15 in the frame means 18.

More, the antenna part 1 can be arranged to operate in a telescopic manner in a direction perpendicular to the longitudinal direction (arrow X) of the card-like wireless communication device CP. Thus, the helix antenna, arranged around a bar-like glide element insulated with an insulation bushing, with its antenna part 1, glides in both directions in the longitudinal direction of this glide element, and the first end and the terminal end of the glide element are provided with a contact for the antenna. The glide element is further provided with an electrical contact with the circuit board 17 by means of the rotary means 2. By pulling out the antenna part 1, a longer antenna is obtained when the antenna is coupled electrically with the contact of the terminal end of the glide element. With the antenna part 1 compressed, the antenna is coupled to the contact of the first end of the glide element, whereby the antenna can also be used.

It is obvious that the invention is not limited solely to the advantageous embodiments of the invention presented above, but it can be modified within the scope of the claims.

What is claimed is:

1. A wireless communication device including a card comprising at least:
   a frame part and
   an antenna structure, the antenna structure including an antenna part and fixing means for arranging the antenna part in connection with the frame part,
   wherein
   the wireless communication device further includes a first part and second part, the parts being arranged movable in relation to each other in at least the longitudinal direction of the wireless communication device; such
   that the first part is arranged as the frame part; and such
   that the second part is arranged as the antenna part which can be moved in at least two different positions, further comprising
   connector means for coupling the wireless communication device to an expansion card connector of a PC device,
   wherein
   the antenna part is placed at the end of the wireless communication device opposite to the connector means, and such
   that the antenna part is arranged transversely in relation to the longitudinal direction of the wireless communication device.

2. The wireless communication device according to claim 1, wherein said card is arranged at least partly as an expansion card complying with the PCMCIA standard, having in a first position of the antenna part a length of about 85.6 mm and a thickness of about a maximum of 3.3 mm, 5.0 mm or 10.5 mm.

3. The wireless communication device according to claim 1, wherein said antenna part is adapted
   (a) to operate in a telescopic manner in a transverse direction to said longitudinal direction of the wireless communication device, or
   (b) to rotate around said longitudinal direction of the wireless communication device, or
   (c) as an antenna part comprising both alternatives (a) and (b).

4. The wireless communication device according to claim 1, wherein said
   frame part or said antenna part is provided with a guide pin means for preventing the rotation of said antenna part in at least its first position and such
   that the guide pin means is arranged to be coupled with a recess means formed in said antenna part or said frame part.

5. The wireless communication device according to claim 1, wherein said device is arranged to be turned off in a first position of said antenna part.

6. The wireless communication device according to claim 1, wherein said fixing means includes a spring-like transfer mechanism for moving said antenna part by pressing from a first position to a second position and further to a third position and for moving said antenna part from the third position to the second position and further to the first position so that the pressing is arranged to take place in a direction compressing the spring-like transfer mechanism, and that the first position is positioned substantially between the third position and the second position.

7. The wireless communication device according to claim 1, wherein said antenna is adapted to be pulled out in relation to said card.

8. A wireless communication device according to claim 1, wherein said antenna part has in its first position a length of a maximum of about 54 mm.

9. A method for the manufacture of a wireless communication device, the wireless communication device comprising at least:
   a frame part, an antenna structure, the antenna structure including an antenna part and fixing means for arranging the antenna part in connection with the frame part, and
   connector means for coupling the wireless communication device to an expansion card connector of a PC device,
   comprising the steps of:
   providing a wireless communication device with a first part and a second part, the first and second parts being arranged movable in relation to each other in at least the longitudinal direction of the wireless communication device;
   arranging the first part as the frame part;
   arranging the second part as the antenna part which can be moved in at least two different positions;
   placing the antenna part at the end of the wireless communication device opposite to the connector means; and
   arranging the antenna part transversely in relation to the longitudinal direction of the wireless communication device.

10. The method according to claim 9, wherein said wireless communication device is arranged at least partly as an expansion card complying with the PCMCIA standard, having in said first position of said antenna part a length of about 85.6 mm and a thickness of about a maximum of 3.3 mm, 5.0 mm or 10.5 mm.

11. The method according to claim 9, wherein said antenna part is arranged
   (a) to operate in a telescopic manner in a transverse direction to said longitudinal direction of said wireless communication device, or
   (b) to rotate around said longitudinal direction of said wireless communication device, or
   (c) as an antenna part comprising either (a) or (b).

12. The method according to claim 9, further comprising the steps of:
   providing said frame part or said antenna part with a guide pin means for preventing the rotation of said antenna part in at least its first position and
   arranging the guide pin means to be coupled with a recess means formed in said antenna part or said frame part.

13. The method according to claim 9, wherein said wireless communication device is arranged to be turned off in said first position of said antenna part.

14. The method according to claim 9, wherein said fixing means are provided with a spring transfer mechanism for moving said antenna part by pressing from a first position to a second position and further to a third position as well as for moving said antenna part from a third position to a second position and further to a first position so that the pressing is arranged to take place in a direction compressing the fixing means, and that the first position is placed substantially between the third position and the second position.

15. A method for the manufacture of a wireless communication device according to claim 1 wherein the antenna part is arranged to have in its first position a length of a maximum of about 54 mm.

16. A wireless communication device including a card comprising at least:
   a frame part and
   an antenna structure, the antenna structure including an antenna part and fixing means for arranging the antenna part in connection with the frame part,
wherein
   the wireless communication device further includes a first part and second part, the parts being arranged movable in relation to each other in at least the longitudinal direction of the wireless communication device; such that the first part is arranged as the frame part such that the second part is arranged as the antenna part which can be moved in at least two different positions; and
   the fixing means includes a spring-like transfer mechanism arranged for moving the antenna part by pressing from a first transport position to a second intermediate position for unlocking the mechanism and allowing it to force the antenna part further to a third operational position, and for moving the antenna part by pressing from the third operational position to the second intermediate position for locking the mechanism and allowing it to force the antenna part no further than to the first transport position so that the pressing is arranged to take place in a direction compressing the spring-like transfer mechanism, and that the first position is positioned substantially between the third position and the second position.

* * * * *